United States Patent [19]
Falempin et al.

[11] Patent Number: 5,586,735
[45] Date of Patent: Dec. 24, 1996

[54] TWO-DIMENSIONAL SUPERSONIC AND HYPERSONIC AIR INTAKE, WITH THREE MOVABLE RAMPS, FOR THE COMBUSTION AIR OF AN AIRCRAFT ENGINE

[75] Inventors: Francois Falempin, Saint Arnoult en Yvelines; Olivier Fourt, Jouy en Josas; Jean-Louis Pastre, Sainte Genevieve des Bois, all of France

[73] Assignee: Office National d'Etudies et de Recherches Aerospatiales, Chatillon-sous-Bagneux, France

[21] Appl. No.: 316,347

[22] Filed: Sep. 30, 1994

[30] Foreign Application Priority Data

Oct. 1, 1993 [FR] France .................... 93 11726

[51] Int. Cl.⁶ .................... B64D 31/00; B64D 33/02
[52] U.S. Cl. .................... 244/53 B; 244/73 R; 137/15.1; 137/15.2
[58] Field of Search .................... 244/52, 53 B, 244/53 R, 73; 137/15.1, 15.2

[56] References Cited

U.S. PATENT DOCUMENTS

| | | |
|---|---|---|
| 3,941,336 | 3/1976 | Nangia . |
| 4,372,505 | 2/1983 | Syberg . |
| 4,919,364 | 4/1990 | John et al. .................... 244/53 B |
| 4,991,795 | 2/1991 | Koncsek . |
| 5,004,187 | 4/1991 | Falempin . |
| 5,005,782 | 4/1991 | Falempin et al. . |
| 5,078,341 | 1/1992 | Bichler et al. .................... 244/53 B |
| 5,337,975 | 8/1994 | Pienemann .................... 244/53 B |

FOREIGN PATENT DOCUMENTS 899625  6/1962  United Kingdom .

Primary Examiner—Gregory L. Huson
Assistant Examiner—Lissi Mojica
Attorney, Agent, or Firm—Larson and Taylor

[57] ABSTRACT

The air intake includes two main flaps (1, 2) facing each other and each pivoting about a pin (4, 5) adjacent to a wall (6, 7) extending the flap in question (1, 2) rearwards, and in which a first boundary layer bleed (8a, 8b) is arranged, the pins (4, 5) being substantially parallel to the plane of the wings or of the fuselage so that the flaps (1, 2) move perpendicularly to this plane, and a ramp (11) pivoting about a pin (12) adjacent to its leading edge (11a) by which it is adjacent to the wings and to the fuselage and substantially parallel to the pins (4, 5) is upstream of the flap (1) which is closest to the wings and with which it delimits another boundary layer bleed (13) of variable cross section.

7 Claims, 4 Drawing Sheets

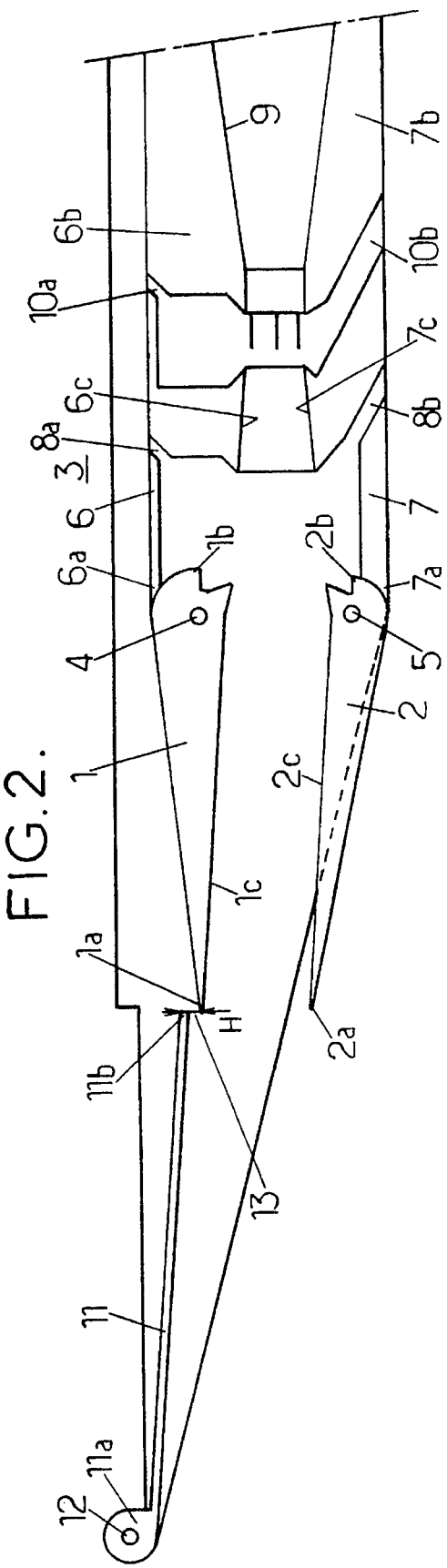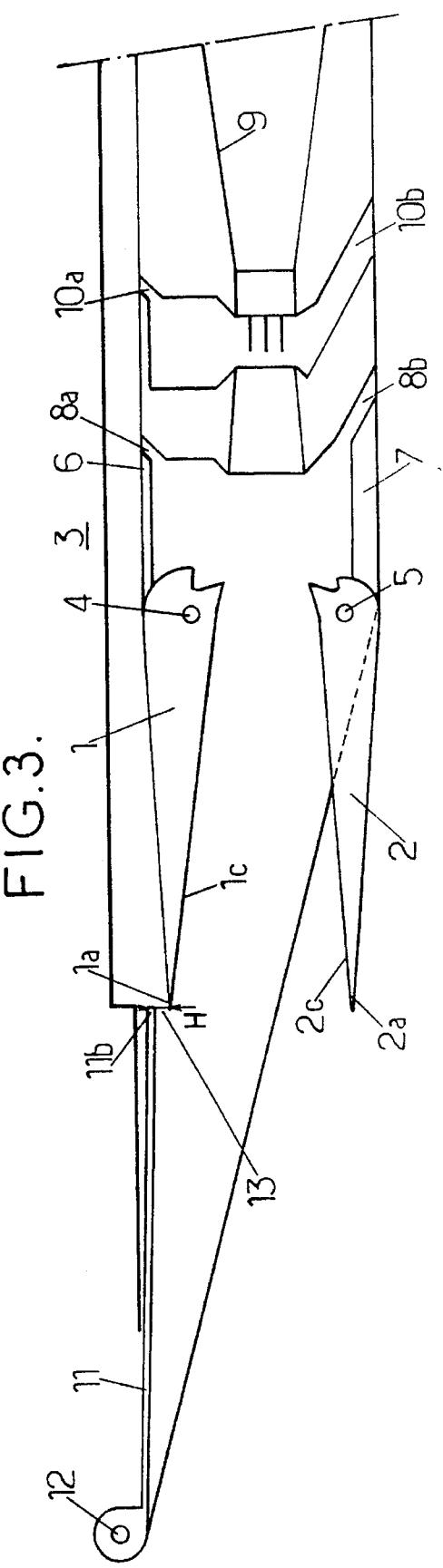

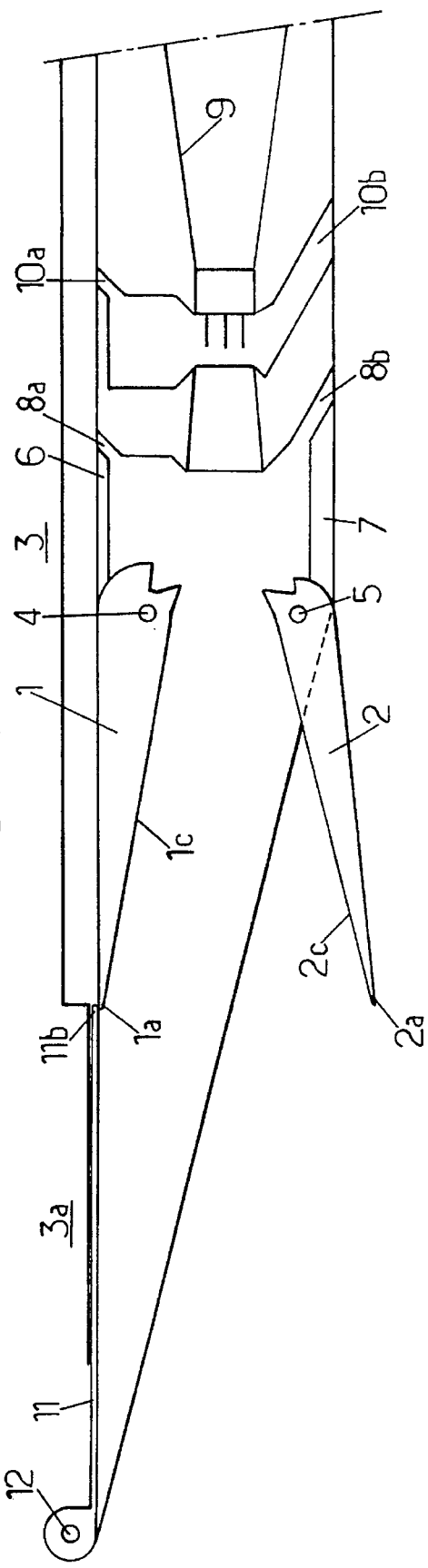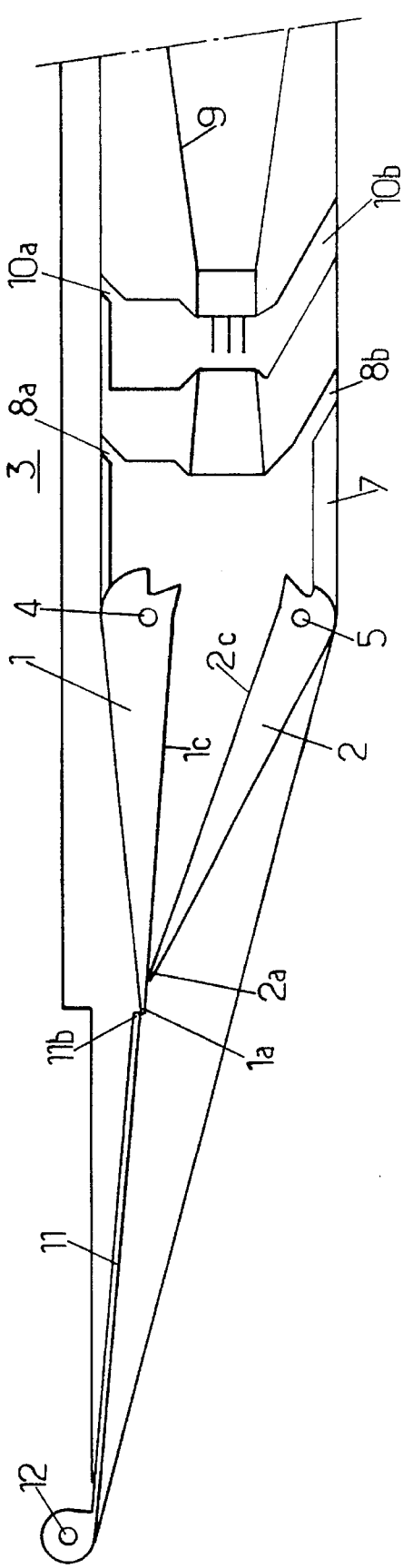

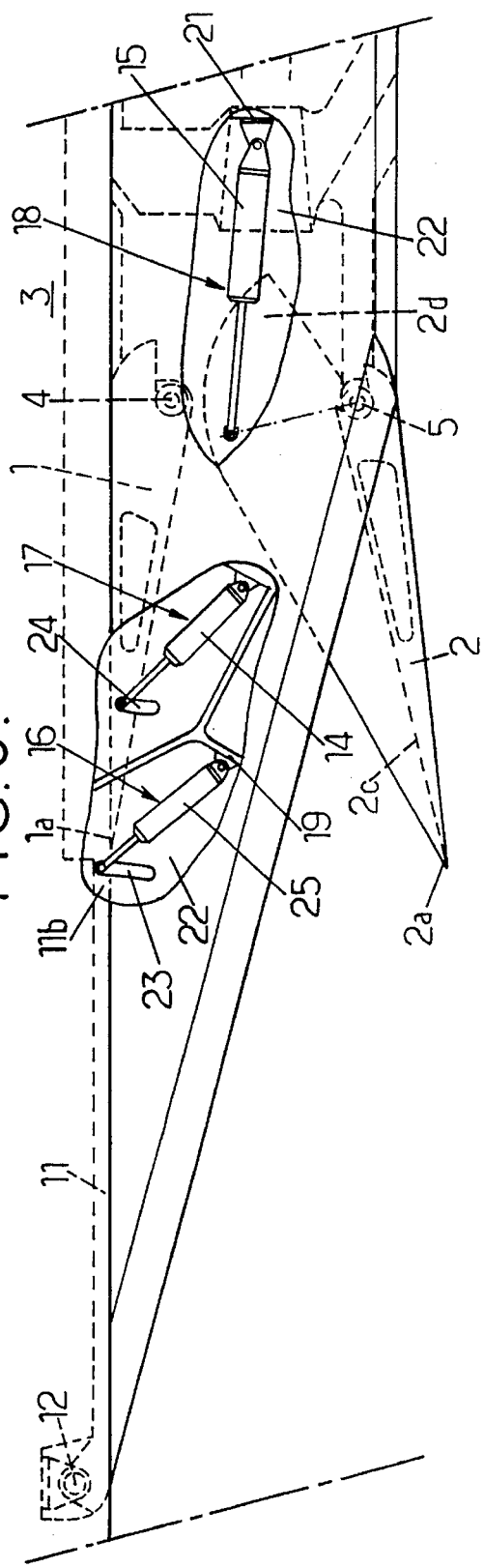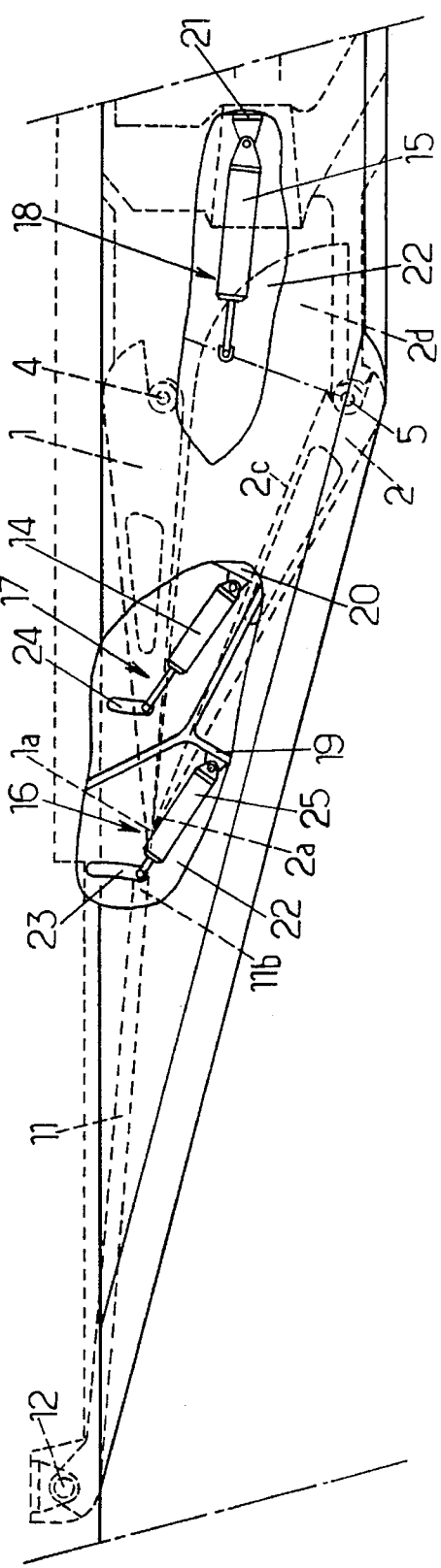

TWO-DIMENSIONAL SUPERSONIC AND HYPERSONIC AIR INTAKE, WITH THREE MOVABLE RAMPS, FOR THE COMBUSTION AIR OF AN AIRCRAFT ENGINE

FIELD OF THE INVENTION

The invention relates to a supersonic and hypersonic air intake for the combustion air of an aircraft engine, this air intake being of the two-dimensional variable-geometry type, and intended to be installed under the wings or the fuselage of the aircraft.

The air intake according to the invention is intended for equipping supersonic and hypersonic airplanes for intercontinental transport, as well as single or multi-stage space launchers with aerobic propulsion.

BACKGROUND OF THE INVENTION

In order to equip such aircraft, it is known that the air intake should not exhibit any drag, mass or bulk which are prohibitive. The air intake must finally be capable of ensuring a correct air supply to the engine or engines, throughout the flight envelope extending up to a high Mach number (about Mach 10 to 12).

The air intake must therefore be able to exhibit good performance, in terms of effectiveness and of throughput, over a large flight envelope, in order to be able to be applied to the abovementioned types of aircraft: for this reason, the air intake must be adapted to the Mach number and to the flight altitude, two parameters which are directly related.

In fact, low altitude flight can be envisaged only at moderate Mach numbers (up to 3), for reasons of temperature properties of materials, whereas at high altitude (20,000 to 30,000 meters), the Mach number has to be markedly greater in order, having regard to the rarefaction of the air, to allow sufficient dynamic pressure to be maintained to provide the lift and/or acceleration of the aircraft.

That being so, in order to obtain high thrust over the whole trajectory of the aircraft, both at low and at high altitude, it is necessary to supply the engine with a very variable throughput of combustion air with a total pressure recovery rate sufficient for all Mach numbers.

The air intake must therefore present an entry cross section which can increase in significant proportions with the increase in the Mach number: this increase in the inlet cross section must be able to carry on up to about Mach 6 or 7.

Variable geometry air inlets have therefore been proposed.

By the French Patent no. 2 635 075, in the name of the present Assignee, a variable-geometry, two-dimensional supersonic air intake is known including, on the one hand, a fairing and, on the other hand, a front flap forming a visor and articulated about a pivot pin situated opposite the fairing, as well as a movable fairing nose, situated in front of the fairing and integral with the front flap, this movable fairing nose being arranged to be displaced in front of the fairing when the front flap is displaced in the direction which increases the cross section of the air intake.

This embodiment, satisfactory up to a Mach number of the order of 4, exhibits the drawback, however, that the Mach range is limited by the significant fairing drag which it involves at very high Mach, greater than 4 or 5.

In order to avoid the drawback of the fairing drag, and in order further to increase the range of variation of the inlet cross section for the combustion air and of the compression ratio, the present Assignee, in French Patent no. 2 635 076, proposed a two-dimensional supersonic and hypersonic air intake, including two visor-forming front flaps, arranged symmetrically on either side of a longitudinal plane of the air intake, each front flap being movable about a pivot pin situated simultaneously in the vicinity of the wall of the air intake which extends the front flap in question, and in the vicinity of a first boundary layer bleed arranged in the said wall of the air intake which extends said front flap rearwards.

The inner walls of the flaps, that is to say the walls each of which is turned towards the other flap, are thus configured as compression ramps which are face to face and vertical under the fuselage and/or the wings of the aircraft.

However, if the adaptation Mach is high, the total deflection, distributed into equal parts between the two compression ramps and the plane of symmetry of the air intake, leads to a very intense shock on the latter, which limits the effectiveness of the air intake at high Mach.

In order to enhance this effectiveness at high Mach, by better distributing the compression over the plane of symmetry, French Patent no. 2 635 076 proposes embodiments which are all the more sophisticated the higher the Mach range to be covered, through the addition, to each front flap, of a movable rear flap linked to the front flap and downstream of the first boundary layer bleed, the rear extremity of this movable rear flap interacting with the front extremity of a movable inner wall element in order to define a second boundary layer bleed, or by configuring the rear part of the inner wall of each front flap, so that it is formed by two articulated wall elements, the first on the front flap in question and the second on the first wall element, the rear extremity of the second wall element interacting with the front extremity of a movable inner wall element in order to define the first boundary layer bleed, the position of which in the channel of the air intake can vary as a function of the Mach number.

However, these embodiments with enhanced effectiveness are of high mechanical complexity and of increased mass.

Moreover, significant shock/boundary layer interaction problems are posed, in the region of the flanks of the air intake, as well as problems of integrating several air intakes of this type under the fuselage of an aerobic space launcher, for example, especially to ensure suitable operation of the propulsion system as a whole in transonic regime (possible blocking of the flow between the engine nacelles).

SUMMARY OF THE INVENTION

The object of the invention is to remedy the drawbacks of the embodiments described in document FR 2 635 076, by more specifically adapting the air intake to an engine of the combined ramjet type, with subsonic combustion then capable of operating as a super ramjet, that is to say as a ramjet for which combustion in the combustion chamber takes place in a flow in supersonic regime, which is necessary especially for an aerobic space launcher, so that the air intake can particularly:

exhibit excellent compatibility with the operation of the engine as a super ramjet, be adapted to flight at high Mach, exhibit a high width over height ratio, have motor means, actuating the movable elements of the air intake, which are limited in number, in dimensions and in mass, dispensing with the cantilevers which create significant forces on the articulations.

To this end, the invention proposes a two-dimensional variable-geometry supersonic and hypersonic air intake, for the combustion air of an aircraft engine, placed under the wings or the fuselage of the aircraft and comprising two main flaps arranged face to face, the inner walls of which, opposite one another are configured as face-to-face compression ramps, and each movable about a pivot axis situated in the vicinity of one wall of the air intake which extends the main flap in question rearwards, in which wall is arranged a first boundary layer bleed, the pivot axes of the two main flaps being substantially parallel to the plane of the wings or of the fuselage, so that the abovementioned main flaps move perpendicularly to this plane, wherein a ramp, which is movable about a pivot axis substantially parallel to the pivot axes of the main flaps, and situated in proximity to its leading edge, is arranged upstream of the main flap closest to the wings or to the fuselage, this upstream ramp being adjacent, at its leading edge, to the wings or to the fuselage and delimiting, with said main flap, another boundary layer bleed of variable cross section.

Such an air intake has the advantage that the orientable upstream ramp diverts the air flow towards the median plane of the air intake and makes it possible, up to the phase of operation as a super ramjet, to form and maintain a boundary layer bleed of variable cross section of satisfactory dimensions. At low Mach number, the frontal cross section of the air intake is minimal, and the upstream ramp is oriented in such a way as to form this boundary layer bleed of variable cross section. When the Mach number increases, the two main flaps are progressively opened, and the upstream ramp is folded back towards the wings or the fuselage in order to keep the same boundary layer bleed of variable cross section. Finally, in super ramjet operating mode, the main flaps are pivoted so as to define maximum opening with the cooperation of the upstream ramp which is extended by the flap following on from it, the boundary layer bleed of variable cross section being closed. The addition of the orientable upstream ramp to the upper main flap, since the air intake is under the wings or the fuselage, makes it possible to limit the increase in drag resulting, in the embodiments of the state of the art, from the use of large front or main flaps with a rear articulation.

Advantageously, the boundary layer bleed of variable cross section may be of zero cross section, so that, for the initial acceleration and re-entry phases, when the combined ramjet of the aircraft is associated with a rocket motor, or for the re-entry phase when the combined ramjet uses ejectors, the boundary layer bleed of variable cross section is also closed in air-intake closed configuration, in which the two main flaps are pivoted against one another.

Advantageously, to this end, the leading edges of the two main flaps may come substantially into contact, in such a way as to close the air intake.

In a general way, the boundary layer bleed of variable cross section exhibits an adjustable passage cross section, which is controlled by motor means of the upstream ramp and of the main flaps.

Advantageously, these actuating motor means of the upstream ramp and of the main flaps are linear actuators installed in at least one lateral fairing of the air intake in line respectively with the above-mentioned upstream ramp and with the abovementioned main flaps, at least one linear actuator acting on at least one of the main flaps in the region of at least one of the lateral flanks integral with this flap.

Advantageously furthermore, the walls of the air intake which extend the main flaps rearwards include fixed compression ramps, facing each other, associated with a fixed diffuser.

In this case, it is furthermore advantageous for the wall of the air intake which extends the main flap not following on from the ramp, and/or the wall of the air intake which extends the main flap following on from the ramp, also to have at least one other boundary layer bleed, blocking of which is controlled by motor means, in particular for the super ramjet phase.

The invention consists, apart from the various arrangements which have just been dealt with, of certain other arrangements which are used preferably at the same time, and which will be dealt with more explicitly later.

The invention could, in any event, be well understood with the aid of the additional description which follows, as well as of attached drawings, which, additions and drawings, relate to a preferred embodiment of the invention and, clearly, are not at all of a limiting nature.

BRIEF DESCRIPTION OF THE DRAWINGS

FIGS. 2 and 3 show, in diagrammatic axial section, and in two different positions, an air intake set out in accordance with one preferred embodiment of the invention, with a boundary layer bleed open between the upstream ramp and the upper flap.

FIGS. 4 and 5 show, in a way similar to FIGS. 2 and 3, and in two different positions, the air intake, the boundary layer bleed of which between the upstream ramp and the upper flap is closed.

FIGS. 6 and 7 show, diagrammatically in lateral elevation and with cutaways, the installation of the motor means in the positions of FIGS. 4 and 5 respectively.

DESCRIPTION OF THE PREFERRED EMBODIMENTS

Figure 1:
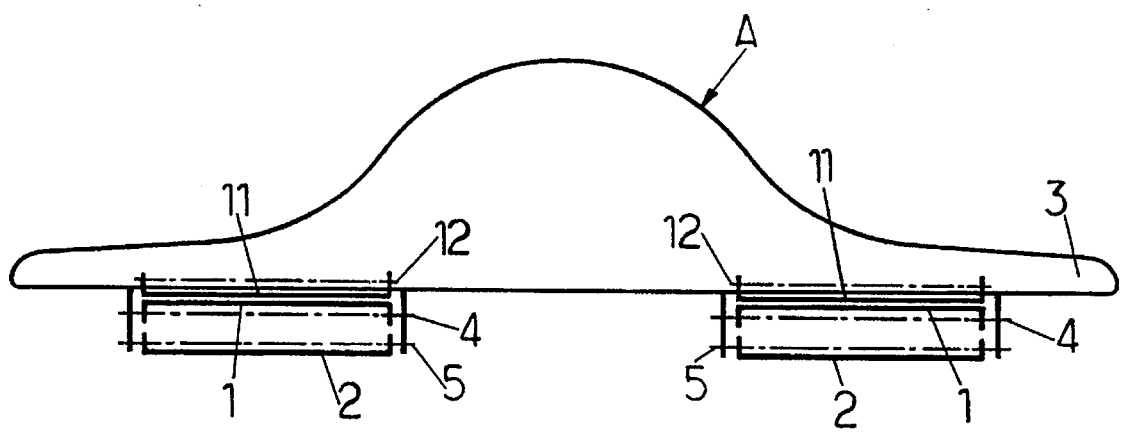
FIG. 1 of these drawings is a frontal diagram of an aircraft equipped with two air intakes in accordance with the invention, and arranged mainly under its wings, and partially under its fuselage.

In FIG. 1, the aircraft is designated, in a general way, by the reference A. Referring also to FIGS. 2 to 5, each air intake includes two movable main flaps 1 and 2, arranged face to face, and each exhibiting a leading edge, 1a and 2a respectively, and a trailing edge, 1b and 2b, respectively, the two leading edges 1a and 2a and the trailing edges 1b and 2b being substantially parallel.

Each of the flaps 1 and 2 is progressively tapered substantially from the region adjacent to its trailing edge 1b or 2b up to its leading edge 1a or 2a, and its inner wall, 1c or 2c respectively, turned towards that of the other flap, is configured as a compression ramp which is substantially plane and movable.

The flap 1, adjacent to the wings 3, or upper flap (since the air intake is installed under the wings 3), is articulated about a pivot pin 4 situated in the vicinity of its trailing edge 1b, and parallel to the latter, as well as substantially to the plane of the wings 3, while being substantially perpendicular to the median longitudinal plane of symmetry of the aircraft A.

The flap 2, which is furthest from the wings 3 or lower flap, is articulated about a pivot pin 5 situated in the vicinity of its trailing edge 2b, and also parallel to this trailing edge 2b as well as substantially to the plane of the wings 3, while also being substantially perpendicular to the median longitudinal plane of symmetry of the aircraft A.

Thus, the two main flaps 1 and 2 move perpendicularly to the plane of the wings 3.

The pin 4 of the upper flap 1 is integral at 6a with a fixed upper wall 6 of the air intake, which extends the upper flap 1 rearwards, and which, projecting towards the median plane of the air intake, has a fixed upper downstream compression ramp 6c which, with the wall 1c, forms a first internal boundary layer bleed, the throughput of which is set by the sonic duct 8a.

Likewise, the pin 5 of the lower flap 2 is integral at 7a with a fixed lower wall 7, which extends the lower flap 2 rearwards, and which has a fixed lower downstream compression ramp 7c, projecting towards the median plane of the air intake and facing the fixed upper ramp 6c with which it forms a fixed convergent, and which, with the wall 2c, forms a second internal boundary layer bleed, the throughput of which is set by the sonic duct 8b.

The rear parts 6b and 7b of the fixed upper 6 and lower 7 walls respectively are associated with a fixed diffuser, designated overall as 9. The fixed upper wall 6, between its part carrying the fixed upper compression ramp 6c and its rear part 6b, has a third internal boundary layer bleed controlled by the sonic duct 10a, while the fixed lower wall 7, between its part carrying the fixed lower compression ramp 7c and its rear part 7b, has a fourth internal boundary layer bleed controlled by the sonic duct 10b.

In a known way, the blocking of one and/or of the other of the boundary layer bleed ducts 8a, 8b and 10a, 10b may be controlled by motor means (actuators) of small size, the installation of which poses no awkward problems.

The air intake also comprises a movable upstream ramp 11, arranged in front of the upper flap 1, and articulated about a pivot pin 12, which is substantially parallel to the pivot pins 4 and 5 of the main flaps 1 and 2, and which is situated in proximity to its leading edge 11a, and substantially parallel to the latter, itself substantially parallel to the leading edges 1a and 2a.

In this example, the region of the ramp 11 which surrounds its pin 12 is housed within the wings 3.

The trailing edge 11b of the orientable ramp 11 is situated just in front of the leading edge 1a of the upper flap 1, so as, with this leading edge 1a, to delimit an external boundary layer bleed 13, the variable passage cross section of which is set by the relative position of the trailing edge 11b and of the leading edge 1a, and thus controlled by the motor means or actuators which control the pivotings of the upper flap 1 and of the upstream ramp 11.

The upstream ramp 11, adjacent to the wings 3 through its leading edge 11a, and the upper flap 1 which follows on from it thus define an upper movable wall of the air intake, with a boundary layer bleed 13 with adjustable passage cross section, while the lower flap 2 defines a movable lower wall of the air intake.

The latter has all its movable 1c, 2c and 11 as well as fixed 6c and 7c compression ramps upstream of its throat, which is fixed and formed between its fixed compression ramps 6c and 7c and the diffuser 9.

The air intake, the structure of which has just been described, operates in the following way.

At low Mach number, in subsonic, transonic and supersonic flight up to Mach 2, the configuration given to the air intake by the motor means actuating the orientable flaps 1 and 2 and the ramp 11 is that represented in FIG. 2: each of the three ramps 11, 1c and 2c is inclined substantially by the same angle (of the order of 4 degrees in absolute value) to the median plane, the ramps 1c and 2c being substantially parallel to one another, the inclination of ramp 1c corresponding to that of the upstream ramp 11, which is spaced away from the wings 3 and the trailing edge 11b of which is spaced away from the leading edge 1a of the upper flap 1 by a vertical distance H which is sufficient to have the desired external boundary layer bleed 13.

From this configuration, for which the frontal cross section of the air intake is minimal, when the Mach number varies between 2 and 5, the motor means progressively space the flaps 1 and 2 away from one another and progressively fold back the upstream ramp 11 towards the wings 3, and these motor means actuate the upstream ramp 11 and the upper flap 1 in such a way as to control their synchronized pivoting so that the boundary layer bleed 13 keeps a constant passage cross section (spacing H preserved between the trailing edge 11b of the ramp 11 and the leading edge 1a of the flap 1).

The configuration represented in FIG. 3 is that obtained for Mach 3.5. The upstream ramp 11 is inclined to the median plane by an angle of the order of 1.5 degrees, the ramps 1c and 2c being inclined respectively to the median plane by an angle of the order of 7 degrees and of 4 degrees and forming a convergent, each of the two ramps 1c and 2c being inclined towards this median plane, from upstream to downstream.

Beyond Mach 5, when the engine (not represented) fed by the air intake, and which is a combined ramjet, operates in super ramjet mode, the configuration given to the air intake by the motor means is that of FIG. 4: the orientable upstream ramp 11 is flattened against the wings 3 or, more precisely, against a part 3a of the latter which constitutes a fixed upper ramp of the air intake, limited, with regard to the trailing edge 11b of the orientable ramp 11, by a notched recess towards the wings 3. The spacing of the flaps 1 and 2 is at maximum, so that the opening of the air intake is at maximum, the opposing ramps 1c and 2c being inclined to the median plane by an angle of the order of 10 degrees and 14 degrees respectively. Another essential difference with respect to the configurations of FIGS. 2 and 3 is that the motor means actuating the upstream ramp 11 and the upper flap 1 bring about the closing of the boundary layer bleed 13, the trailing edge 11b of the ramp 11 being directly applied against the leading edge 1a of the upper flap 1.

Moreover, when the engine is a combined ramjet with ejectors, or a combined ramjet associated with a pure rocket motor, the air intake, in the initial acceleration and re-entry phases, may respectively take a closed configuration, represented in FIG. 5. The mobility of the flaps 1 and 2 and the motor means which actuate them allow the two flaps 1 and 2 to pivot towards one another, until the leading edge 2a of the lower flap 2 is applied against the ramp 1c of the upper flap 1 in proximity to its leading edge 1a and, simultaneously, the upstream ramp 11 is spaced away from the wings and pivoted by its motor means until its trailing edge 11b is applied against the leading edge 1a of the upper flap 1 in order to keep the boundary layer bleed 13 closed.

Thus, the orientable upstream ramp 11 diverts the flow towards the median plane of the air intake, and, in the first place, allows adaptation of the direction of the flow with respect to the orientation of the median plane of the face-to-face ramps 1c and 2c, and, in association with the lower ramp 2c, allows setting of the inlet cross section to the inlet throughput capabilities of the minimum cross section, delimited at the downstream extremity of the fixed-geometry, fixed rear compression ramps 6c and 7c, of the air intake, in particular in transonic regime, for which the air inlet then operates practically as a two-dimensional air intake, which has an adjustable inlet cross section.

The orientable upstream ramp 11 also makes it possible to form and to maintain an external boundary layer bleed 13 of satisfactory dimensions during all the phases of operation which precede operation in super ramjet regime, except when the combined ramjet is associated with a pure rocket motor and when the air intake and this boundary layer bleed are closed in initial acceleration phase, the orientable upstream ramp 11 allowing cancellation (or closing) of this boundary layer bleed 13 as from the transition Mach towards this phase of operation as a super ramjet, that is to say about Mach 5.

Without taking into account the motor means bringing about the closing of the sonic ducts for control of the internal boundary layer bleeds 8a, 8b and 10a, 10b in super ramjet phase, as their embodiment and their installation are conventional and pose no particular problem, the main motor means are limited to three linear actuators 25, 14 and 15, such as hydraulic jacks, respectively maneuvering the upper upstream ramp 11, the upper flap 1 and the lower flap 2, as represented diagrammatically in FIGS. 6 and 7. These figures correspond respectively to the configurations of FIGS. 4 and 5 (super ramjet phase and air intake closed) and thus represent the three members actuated into their two extreme positions, on opening (FIG. 6) and on closing (FIG. 7) of the air intake. The jacks 25, 14 and 15 are installed in a very much simplified way, each in one of three lateral fairings respectively, partially and diagrammatically represented at 16, 17 and 18, each put in place in line with the member maneuvered by the jack which it accommodates, and delimited partially by bearing ribs 19, 20 and 21 on the outer face of a lateral flank 22 of the air intake. Each of the jacks 25, 14 and 15 is articulated by the closed end of its cylinder on a fixed point of the corresponding bearing rib 19, 20 or 21, while the extremity of the rod which is external to the cylinder of the jacks 25 and 14 is articulated onto a lateral fixed point respectively of the trailing edge 11b of the upstream ramp 11 and of the upper flap 1 in proximity to its leading edge. The travel of these fixed points of articulation on the ramp 11 and the upper flap 1 are each limited by a slot 23 or 24 formed in the flank 22 and each curved into the shape of a circular arc centered respectively on the pin 12 and the pivot pin 4 of the ramp 11 and of the flap 1. In contrast, the extremity of the rod of the jack 15 is articulated at a fixed point on a lateral flank 2d of the lower flap 2, in the region of a circular sector exhibited by this flank 2d in proximity to the pin 5.

This embodiment, which limits the number and the dimensions of the actuators, also greatly limits the forces on the articulation pins, and thus on the structure, due to the suppression of all significant cantilevering, which can have the consequence of introducing too much flexibility, detrimental to the dynamic stability of the flaps 1 and 2 and of the ramp 11.

The air intake according to the invention, which carries out compression of the air via a pair of movable ramps 1c, 2c, which are face to face and have vertical opening, followed by a pair of fixed ramps 6c, 7c, face to face, and equipped with an orientable upstream ramp 11 making it possible to adapt the geometry whatever the opening of the face-to-face movable ramps, 1c and 2c, exhibits numerous advantages: the assembly consisting of the two fixed rear ramps 6c and 7c and the diffuser 9 is fixed overall, which allows easy feeding of the minimum cross section or fixed throat of the air intake with fuel and greatly facilitates the design of the chamber of the super ramjet, so that this air intake is highly compatible with a combined ramjet, in order to provide for its operation as a super ramjet.

It should be noted that the fixed nature of the ramps 6c and 7c as a whole and of the diffuser 9 also has the consequence of limiting the number of motor means.

The design of the air intake makes it possible to limit the effect of shock/boundary layer interactions on the side walls of the air intake, which can be spaced very far apart (for example with a width of 4 m for an inlet height of 72 cm at Mach 2). The length of the compression region is reduced, and the air intake is suitable for presenting a very large width over height ratio of its inlet cross section, which makes it pointless, or at least of little benefit, to provide lateral flanks integral with the upstream ramp 11 and the upper flap 1, and has the consequence of further reducing the shock/boundary layer interaction effects on the flanks.

The air intake is adapted to flight at high Mach at high dynamic pressure (80 kPa) associated with a steep lift gradient (necessary for horizontal take-off) which induces very limited flight incidence (of the order of 2 degrees), reacting badly to a substantial alteration in the orientation of the median plane of the air intake, as is the case in embodiments of the state of the art.

The two-dimensional air intake with variable-inlet cross section described above, and in which the orientation of the opening makes it possible to reduce the effect of shock/boundary layer interactions on the flanks, and to limit the dimensions, the motorization forces and thus the general mass, is thus particularly well adapted to the requirements of a combined ramjet, possibly of the type with ejectors.

This air intake is therefore advantageously employed on orbital airplanes of large size (possibly reaching 70 m in length), the variable-geometry air intakes of which, necessarily of very large cross section, have to have as low a height as possible so that, on the one hand, the air intake is situated outside the region of the shock wave developed by the front of the aircraft at high Mach numbers and, on the other hand, in order to reduce the influence on performance of the detrimental phenomena of shock wave/boundary layer interactions on the side walls. To this extremity, the vertical opening of the movable flaps and of the orientable ramp of the air intake gives rise to shock wave/boundary layer interactions which occur on under-developed boundary layers, and in the absence of an interaction with the boundary layer of the fuselage and/or of the wings. Their detrimental effect is felt on a smaller fraction of the flow rate taken in, as the width over height ratio of the air intake is larger than in prior embodiments. This reversal of the width over height ratio leads to a substantial reduction in the length of the air intake, and hence to a reduction in mass of the general structure, and a reduction in the forces applied to the articulations and to the motor means, leading to a further reduction in mass.

We claim:

1. A two-dimensional variable-geometry supersonic and hypersonic air intake, for the combustion air of an aircraft engine, placed under the wings or the fuselage of the aircraft and comprising two main flaps arranged face to face and each movable about a pivot axis situated in the vicinity of one wall of the air intake which extends the main flap in question rearwards, in which wall is arranged a first boundary layer bleed, the pivot axes of the two main flaps being substantially parallel to the plane of the wings or of the fuselage, so that the abovementioned main flaps move perpendicularly to this plane, wherein a ramp, which is movable about a pivot axis substantially parallel to the pivot axes of the main flaps, and situated in proximity to its leading edge, is arranged upstream of the main flap closest to the wings or to the fuselage, this upstream ramp being adjacent, at its leading edge, to the wings or to the fuselage and delimiting, with said main flap, a boundary layer bleed of variable cross section and wherein the boundary layer bleed of variable cross section may be of zero cross section.

2. The air intake as claimed in claim 1, wherein the walls of the air intake which extend the main flaps include fixed compression ramps, facing each other, associated with a fixed diffuser.

3. The air intake as claimed in claim 1, wherein the leading edges of the two main flaps may come substantially into contact.

4. The air intake as claimed in claim 1, wherein the boundary layer bleed of variable cross section exhibits an adjustable passage cross section which is controlled by motor means of the upstream ramp and of the main flaps.

5. The air intake as claimed in claim 1, wherein the actuating motor means of the upstream ramp and of the main flaps are linear actuators installed in at least one lateral fairing of the air intake in line respectively with the abovementioned upstream ramp and with the abovementioned main flaps, at least one linear actuator acting on at least one of the main flaps in the region of at least one of lateral flanks integral with this flap.

6. The air intake as claimed in claim 2, wherein the wall of the air intake which extends the main flap following on from the ramp exhibits at least one other boundary layer bleed, blocking of which is controlled by motor means.

7. The air intake as claimed in claim 2, wherein the wall of the air intake which extends the main flap not following on from the ramp exhibits at least one other boundary layer bleed, blocking of which is controlled by motor means.

* * * * *